United States Patent
Petkar

(10) Patent No.: US 11,281,521 B1
(45) Date of Patent: Mar. 22, 2022

(54) METHODS, SYSTEMS AND COMPUTER READABLE MEDIA FOR TROUBLESHOOTING TEST ENVIRONMENTS USING AUTOMATED ANALYSIS OF LOG FILE DATA

(71) Applicant: Keysight Technologies, Inc., Santa Rosa, CA (US)

(72) Inventor: Prasad Ganesh Petkar, Pune (IN)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 0 days.

(21) Appl. No.: 17/197,194

(22) Filed: Mar. 10, 2021

(51) Int. Cl.
*G06F 11/00* (2006.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0778* (2013.01)

(58) Field of Classification Search
CPC ............. G06F 11/0709; G06F 11/0706; G06F 11/0751; G06F 11/0778
USPC ........................................................ 714/1–57
See application file for complete search history.

(56) References Cited

U.S. PATENT DOCUMENTS

| | | |
|---|---|---|
| 9,424,115 B2 | 8/2016 | Jiang et al. |
| 9,785,889 B2 | 10/2017 | Bechet et al. |
| 10,528,454 B1 | 1/2020 | Baraty et al. |
| 10,831,585 B2 | 11/2020 | Gu |
| 2003/0065967 A1* | 4/2003 | Garcia ................ G06F 11/2257 714/1 |
| 2010/0229022 A1* | 9/2010 | Anand ................. G06F 11/079 714/2 |
| 2012/0011403 A1* | 1/2012 | Bock ..................... G06F 11/263 714/30 |
| 2015/0193319 A1* | 7/2015 | Southern .............. G06F 11/263 714/41 |
| 2016/0062815 A1* | 3/2016 | Ivanova ................ G06N 7/005 714/26 |

(Continued)

FOREIGN PATENT DOCUMENTS

CN 102196478 B 9/2011

OTHER PUBLICATIONS

Holkovic et al., "Using Rule-Based Decision Trees for Automatic Passive Diagnostics of the Network Problems," International Journal on Advances in Networks and Services, vol. 13, No. 1 & 2, pp. 1-10 (2020).

(Continued)

*Primary Examiner* — Sarai E Butler

(57) ABSTRACT

The subject matter described herein includes methods, systems, and computer readable media for troubleshooting using automated analysis of log file data. A method for troubleshooting test environments using automated analysis of log file data occurs at a data analyzer. The method includes receiving a log file data comprising information indicating at least one error code; determining, using the log file data, an analysis algorithm, and an integrated troubleshooting data store comprising associations between error codes obtained from a standards body or technical specification data source and resolution recommendations obtained from a technical support data source, at least one resolution recommendation; and providing, via a user interface, the at least one resolution recommendation to a user.

20 Claims, 6 Drawing Sheets

(56) References Cited

U.S. PATENT DOCUMENTS

| | | | |
|---|---|---|---|
| 2016/0092294 A1* | 3/2016 | Laaksonen | H04W 24/04 |
| | | | 714/45 |
| 2016/0117211 A1* | 4/2016 | Makuch | G06N 5/022 |
| | | | 705/39 |
| 2017/0255507 A1* | 9/2017 | Milor | G06F 11/073 |
| 2018/0034805 A1* | 2/2018 | Eichen | H04L 9/3263 |
| 2019/0163553 A1 | 5/2019 | Ramegowda et al. | |
| 2020/0341888 A1 | 10/2020 | Sridhar et al. | |

OTHER PUBLICATIONS

"Keysight 5G Protocol R&D Toolset," Keysight Technologies, Inc., pp. 1-14 (2018).

* cited by examiner

| ERROR CODE | ERROR DESCRIPTION | RESOLUTION CODE | RESOLUTION | RESOLUTION TARGET(S) | DATA SOURCE |
|---|---|---|---|---|---|
| 1 | SCG radio link failure | 1 | Check t310-Expiry | RF TEST TOOL | JIRA |
| 1 | SCG radio link failure | 2 | Check timeAlignmentTimer and RRC Inactivity timer | RF TEST TOOL | JIRA |
| 1 | SCG radio link failure | 3 | Check rlc-MaxNumRetx | RF TEST TOOL | JIRA |
| 2 | RRCReconfig Process handling for TDD CA mobility | 4 | Change the PRACH configuration. If PUSCH non-detected situation still happens | DUT | JIRA |
| 3 | BWP switch failure for First Active BWP ID 1 | 5 | Set a firstActiveUplinkBWP-Id to 1 for SCC | RF TEST TOOL | JIRA |
| 4 | Registration Reject | 6 | Check T3510 Expire | RF TEST TOOL | 3GPP |
| 5 | 5GS services not allowed | 7 | Check if the USIM is invalid for 5GS services | UE | 3GPP |

METHODS, SYSTEMS AND COMPUTER READABLE MEDIA FOR TROUBLESHOOTING TEST ENVIRONMENTS USING AUTOMATED ANALYSIS OF LOG FILE DATA

TECHNICAL FIELD

The subject matter described herein relates to testing networks. More particularly, the subject matter described herein relates to methods, systems, and computer readable media for troubleshooting test environments using automated analysis of log file data.

BACKGROUND

Network operators generally use test platforms or related software to test networks or related nodes for various issues. Since test environments can involve multiple nodes and/or communications protocols, setting up a test environment can be tedious, complex, and time intensive. As such, sometimes errors and/or failures occur during configuration or setup of test environments, prior to testing. Time and resources spent resolving these issues can have an significant impact on testing and subsequent deployment.

Further, while test platforms may generate log files and related data for debugging and/or other purposes, such test platforms may lack root cause analysis (RCA) functionality and/or other troubleshooting functionality. Hence, to resolve configuration or setup related issues, a network operator may need to manually review a log file in an effort to spot a root cause or reason for failure. However, the network operator may require a relatively high level of technical expertise to effectively parse a log file and/or to perform RCA using the log file data.

SUMMARY

The subject matter described herein includes methods, systems, and computer readable media for troubleshooting test environments using automated analysis of log file data. A method for troubleshooting test environments using automated analysis of log file data includes receiving a log file data comprising information indicating at least one error code; determining, using the log file data, an analysis algorithm, and an integrated troubleshooting data store comprising associations between error codes obtained from a standards body or technical specification data source and resolution recommendations obtained from a technical support data source, at least one resolution recommendation; and providing, via a user interface, the at least one resolution recommendation to a user.

A system for troubleshooting test environments using automated analysis of log file data includes at least one processor, a memory and a data analyzer implemented using the at least one processor and the memory. The data analyzer is configured for: receiving a log file data comprising information indicating at least one error code; determining, using the log file data, an analysis algorithm, and an integrated troubleshooting data store comprising associations between error codes obtained from a standards body or technical specification data source and resolution recommendations obtained from a technical support data source, at least one resolution recommendation; and providing, via a user interface, the at least one resolution recommendation to a user.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIG. 3 is a diagram illustrating example troubleshooting data including error codes and corresponding resolution recommendations;

DETAILED DESCRIPTION

Figure 1:
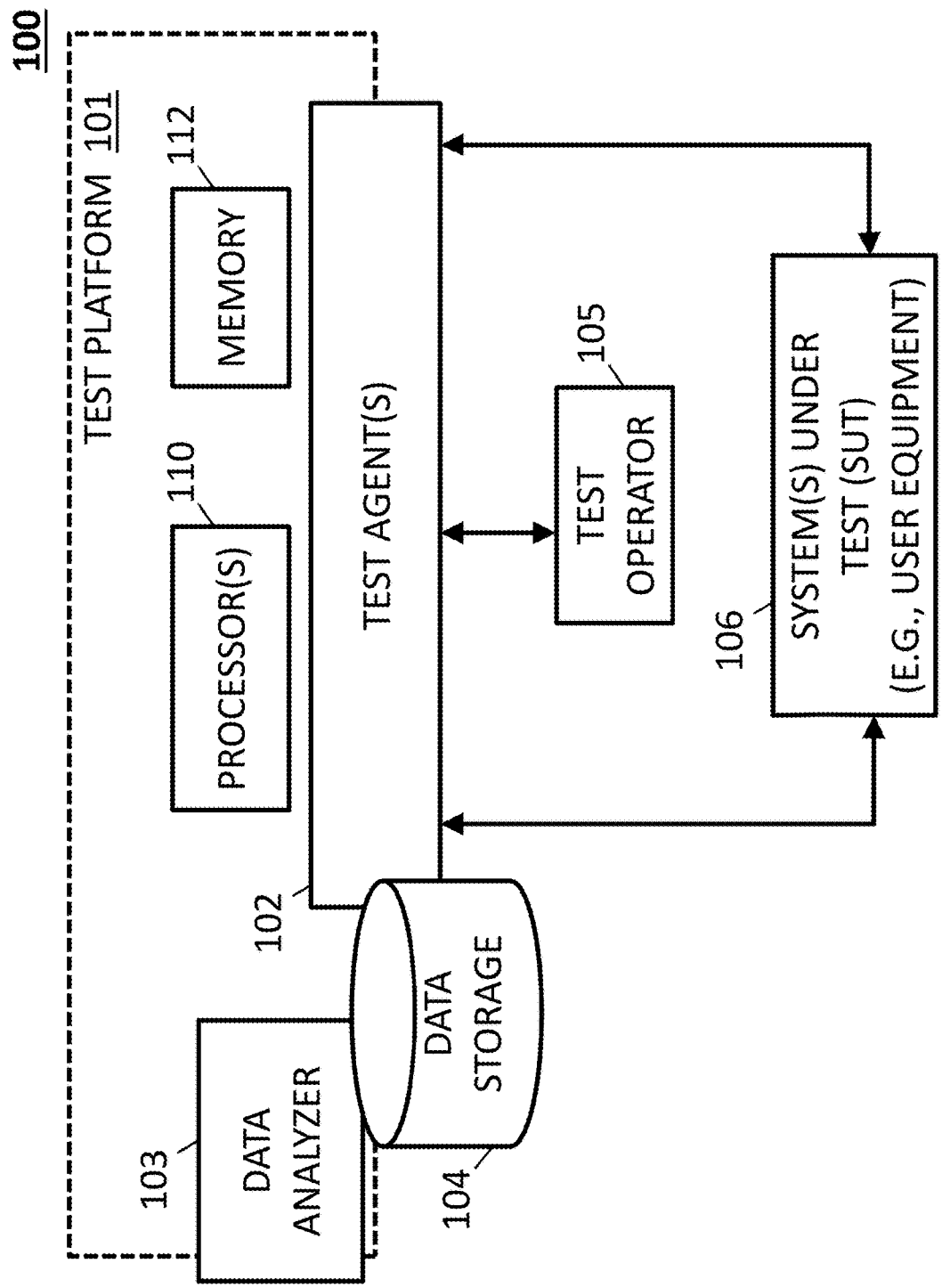
FIG. 1 is a block diagram illustrating an example test environment for troubleshooting using automated analysis of log file data.

The subject matter described herein includes methods, systems, and computer readable media for troubleshooting test environments using automated analysis of log file data. Network operators generally use test platform to test networks and/or related nodes for various issues. However, since test environments can involve multiple nodes and/or communications protocols, setting up a test environment can be tedious, complex, and time intensive. As such, sometimes errors and/or failures occur during configuration or set up of test environments. Resolving these issues can require significant time and resources.

Further, while many test platforms can generate log files and related data for debugging and/or other purposes, such test platforms may lack root cause analysis (RCA) and/or other troubleshooting functionality. For example, some test tools (e.g., a network protocol tool, a protocol carrier acceptance tool, a protocol conformance tool, a radio frequency (RF) conformance test tool, etc.) may generate log files of various formats (e.g., ".alf", ".rtt", ".pcap", ".iq", ".xml", etc.) may include software for viewing or parsing these files (e.g., a log file viewer). However, such tools or related software may fail to detect or provide root causes for failures (e.g., errors) when executing a test session or a related script.

In contrast, test platform or test tool manufacturers may maintain an issue tracking system or a technical support system that contains issues, their root causes, and/or other related information derived or obtained from customer reports and/or human-initiated analysis. For example, Jira may be used by software developers to keep track of issues and various problems reported by users by using tickets. In this example, once an issue or error is resolved, a root cause explanation along with resolution information may be stored and associated with the corresponding ticket. However, while technical support systems can have data usable for troubleshooting various issues, such information is generally not directly accessible to customers and/or is not easily correlated with customer-facing data (e.g., 3GPP error codes) and/or applications (e.g., log file viewers).

In accordance with some aspects of the subject matter described herein, techniques, methods, or mechanisms are disclosed for troubleshooting test environments using automated analysis of log file data. For example, a data analyzer in accordance with aspects described herein may receive log file data comprising information indicating at least one error code; determine, using the log file data, an analysis algorithm, and an integrated troubleshooting data store comprising associations between error codes obtained from a standards body or technical specification data source and resolution recommendations obtained from a technical support data source, at least one resolution recommendation; and provide, via a user interface, the at least one resolution recommendation to a user.

In accordance with some aspects of the subject matter described herein, an integrated troubleshooting data store may be generated using multiple, distinct data sources, e.g., a technical specification document and an issue tracking system data store. For example, a test platform or related software may perform testing involving a standards document or a technical specification. The standards document or technical specification may include error codes or information usable for indicating particular errors or failures or types thereof, but may lack details regarding how the errors or failures occur and/or how to prevent them from occurring. In this example, an issue tracking system associated with the test platform or related software (e.g., maintained by the manufacturer) may maintain a data store containing root causes for failed test runs, e.g., where the root causes may be diagnosed and/or discerned by programmers or testers. Continuing with this example, an integrated troubleshooting data store may be generated, where the integrated troubleshooting data store includes associations between error codes (or related identifiers) and corresponding probable root causes and/or resolution recommendations.

In accordance with some aspects of the subject matter described herein, an integrated troubleshooting data store may be integrated with a test platform or a log file data viewer. For example, a test platform may generate log files indicating various details regarding a test session and may utilize a log file viewer to show log file data. In this example, the log file viewer may be further configured to review a log file for error codes or other error indicators and may display resolution information (e.g., root cause information, resolution recommendations, etc.) in the log file viewer based on identified error codes or other error indicators.

Advantageously, in accordance with some aspects of the subject matter described herein, network testing and related configuration may be improved by troubleshooting test environments using automated analysis of log file data. For example, an example data analyzer in accordance with some aspects of the subject matter described herein may utilize a trained machine learning based algorithm and an integrated troubleshooting data store containing error codes and corresponding resolution information to quickly identify resolutions for one or more errors found in a log file. In this example, by integrated RCA or related functionality using automated analysis into a test platform or a related log file viewer, a user may be provided a root cause for an error automatically (e.g., by a test related GUI after a failed test run) so that the user can make changes to the testing setup, change a testing script, and/or identify a programming bug in a test platform or related tool. As such, automated analysis can reduce time spent analyzing log file data thus improving a related validation cycle for customers. Also, by providing improved or enhanced troubleshooting to customers, test tool manufacturers may experience reduced technical support demands from their customers.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a block diagram illustrating an example test environment 100 for troubleshooting using automated analysis of log file data. Referring to FIG. 1, test environment 100 may include a test platform 101 and a system under test (SUT) 106. In some embodiments, SUT 106 may represent user equipment (UE), a network device, or another entity. For example, SUT 106 may include 5G or 4G capable user equipment. In another example, SUT 106 may include an access network element, e.g., eNodeB or a transceiver along with one or more UEs.

Test platform 101 may represent any suitable entity or entities (e.g., one or more testing platforms, nodes, or devices) associated with sending or receiving traffic (e.g., one or more messages or other packets). For example, test platform 101 may generate a substantial amount of traffic for testing SUT 106. In this example, test platform 101 may receive traffic from SUT 106 and analyze one or more performance related aspects associated with SUT 106.

In some embodiments, test platform 101 may be a stand-alone tool, a testing device, or software executing on a processor. In some embodiments, network equipment test platform 101 may be a single node or may be distributed across multiple devices or nodes.

In some embodiments, test platform 101 may include one or more modules and/or agents for performing various functions. For example, test platform 101 may include a network node emulation module for emulating a node or device that communicates with SUT 106. In some embodiments, test platform 101 may include one or more test agent(s) 102, a data analyzer 103, and a data storage 104.

Test platform 101 may include one or more processor(s) 110 and a memory 112. Processor(s) 110 may represent or include a physical processor, a general purpose microprocessor, a single-core processor, a multi-core processor, a field-programmable gateway array (FPGA), and/or an application-specific integrated circuit (ASIC) for executing software and/or logic stored in memory 112. Memory 112 may represent one or more computer readable media for storing data, logic, or other information.

Test platform 101 may interact with test operator 105. Test operator 105 may represent any entity (e.g., an automated system or a device or system controlled or controllable by a human user) for selecting and/or configuring various aspects associated with testing and/or test related data analysis. For example, various user interfaces (UIs) (e.g., an application user interface (API) and a graphical user interface (GUI)) may be provided for interacting with test platform 101 or related entities, e.g., data analyzer 103 and/or test agent(s) 102.

Test agent(s) 102 may represent any suitable entity or entities (e.g., one or more computing platforms or software implemented using processor(s) 110) for testing SUT 106 or portions therein, for monitoring traffic, and/or for observing network behavior. For example, test agent(s) 102 may generate test traffic for SUT 106 and respond to traffic from SUT 106 during a test session.

In some embodiments, test agent(s) 102 and/or related monitoring functionality may be configured to generate and/or provide log files or test related information to data analyzer 103 or a related entity periodically (e.g., every five minutes) or aperiodically (e.g., dynamically, on request, or after a test session is completed). In some embodiments, test agent(s) 102 and/or related monitoring functionality may be configured to store log files or related data in data storage (e.g., data storage 104 and/or other storage).

Data analyzer 103 may represent any suitable entity (e.g., one or more computing platforms or a testing tool implemented using processor(s) 110) for performing various aspects associated with analyzing log file data, performing troubleshooting, and/or determining resolution recommendations. Data analyzer 103 may include one or more processors, one or more memories, and may include one or more communications interface(s).

Data storage 104 may represent any suitable entity (e.g., a computer readable medium, a database, a storage device, or memory) for storing troubleshooting related data, error or issue related information data, reason or cause related information, resolution related information, and/or other data. For example, data storage 104 may store associations between from a 3rd Generation Partnership Project (3GPP) error codes (e.g., error codes gleaned from 3GPP technical specifications) and corresponding reasons or root causes of errors (e.g., resolution recommendations gathered from an issue tracking system or a software development data store).

In some embodiments, data analyzer 103 may provide, via a UI, at least one resolution recommendation to a user, e.g., test operator 105. For example, a troubleshooting report may be display using a web-based portal via a web browser or via a log file viewer application. In this example, resolution recommendations may be sortable or filterable based on a user selection of a particular error code or issue. In some embodiments, resolution recommendations may be based on users and/or expert feedback (e.g., obtained from a technical support data store or issue tracking system data store).

In some embodiments, data analyzer 103 or a related entity may provide instructions or a guided walkthrough for implementing one or more resolution recommendations. In some embodiments, e.g., after being approved or selected by a network administrator, data analyzer 103 or a related entity may automatically implement one or more resolution recommendations using scripts, APIs, or other mechanisms.

In some embodiments, after one or more resolution recommendations are implemented, data analyzer 103 or a related entity may validate the one or more resolution recommendations by performing a second test session and analyzing whether the same issue or error still occurred. For example, after implementing a resolution, results from a subsequent test session may indicate that an error or issue is resolved or may indicate that the error or issue still exists or a new error or issue is occurring.

Data storage 104 may represent any suitable entity (e.g., a computer readable medium, a database, a storage device, or memory) for storing test session related data, log file data, received traffic metrics, and/or other data. For example, data storage 104 may store copies of messages or related details from messages sent or received by an associated network node.

In some embodiments, data storage 104 may also include information usable for analyzing log file data, troubleshooting error codes, and/or determining resolution recommendations for resolving various errors or issues.

It will be appreciated that FIG. 1 is for illustrative purposes and that various depicted entities, their locations, and/or their functions described above in relation to FIG. 1 may be changed, altered, added, or removed.

Figure 2:
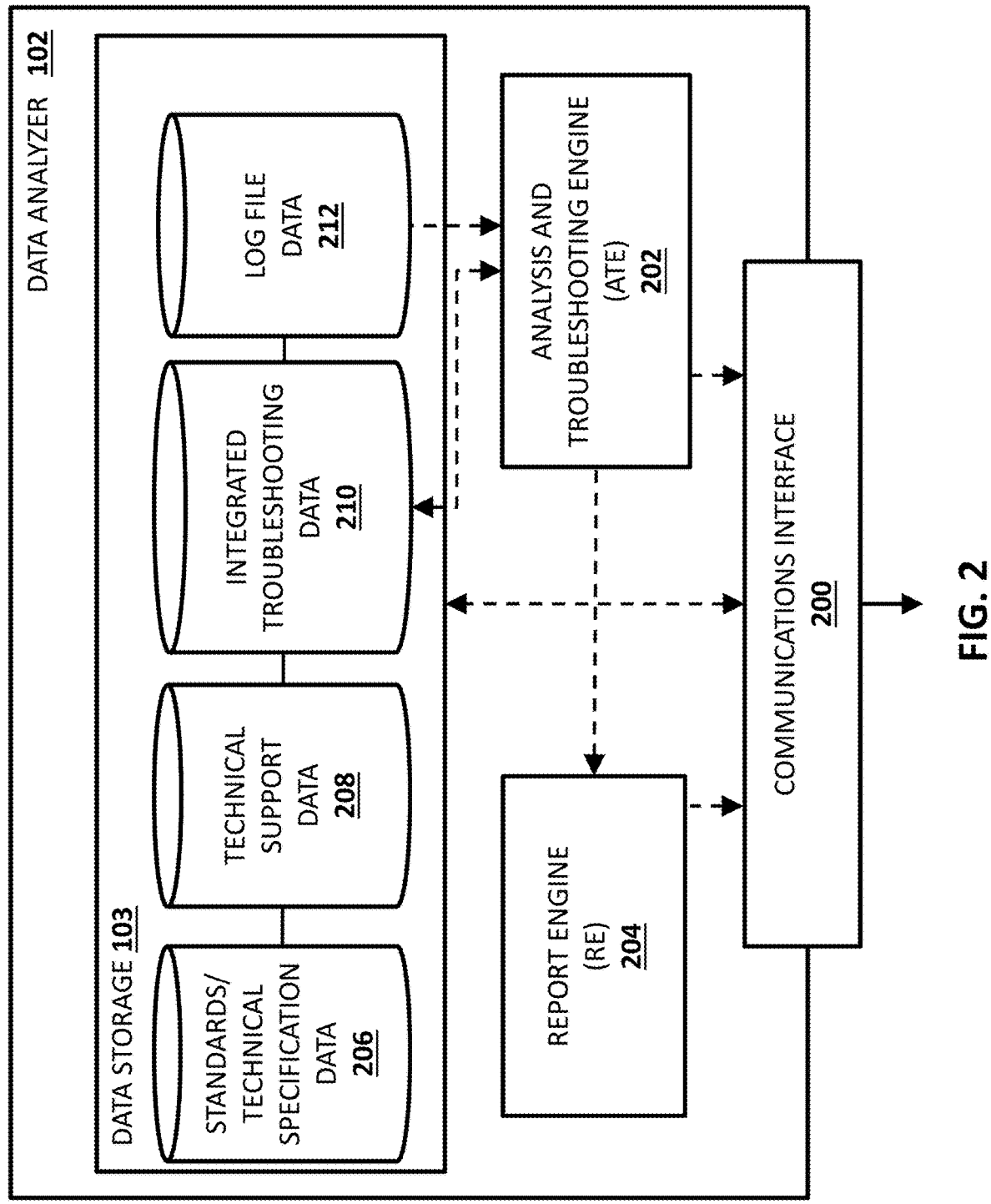
FIG. 2 is a block diagram illustrating an example data analyzer.

FIG. 2 is a block diagram illustrating an example data analyzer 103. Referring to FIG. 2, data analyzer 103 may include one or more processors, one or more memories, and may include one or more communications interface(s) 200, an analysis and troubleshooting engine (ATE) 202, a report engine (RE) 204, data storage 104 containing standards and/or technical specification (standards/technical specification) data 206 (e.g., 3GPP error codes or other related information), technical support data 208 (e.g., identified issues and solutions provided by a technical support technician or a related data store), integrated troubleshooting data 210 (e.g., associations between error codes and possible solutions from disparate data sources), and log file data 212 (e.g., log files of various formats from one or more test tools or platforms).

Data analyzer 103 may include one or more processors, one or more memories, and may include one or more communications interface(s) 200. communications interface(s) 200 may represent any suitable entity or entities (e.g., one or more network interface cards (NICs), physical processors, and/or other hardware) for sending or receiving communications. For example, communications interface(s) 200 may include one or more interfaces for communicating with various nodes and/or related storage, e.g., to obtain or access log file data from test agent(s) 102, and/or other entities, e.g., network taps. In another example, communications interface(s) 200 may provide or facilitate a UI and/or an API for allowing of test operator 105 or other entity to interact with data analyzer 103.

ATE 202 may represent any suitable entity or entities (e.g., software executing on at least one processor, an FPGA, an ASIC, or a combination of software, an ASIC, or an FPGA) for performing one or more aspects associated with analyzing log file data received from one or more sources (e.g., test agent(s) 102 and/or network tap(s)) and determining one or more resolution recommendations based on the analysis. In some embodiments, ATE 202 may use a log file selected by a user, where the log file includes various types of test related data (e.g., test session metrics, error codes, status messages from SUT 106 or related nodes) and may access integrated troubleshooting data 210 for generating a troubleshooting report and/or resolution recommendations. In such embodiments, the troubleshooting report and/or resolution recommendations may be sent to RE 204 for displaying to a user or another entity.

RE 204 may represent any suitable entity or entities (e.g., software executing on at least one processor, an FPGA, an ASIC, or a combination of software, an ASIC, or an FPGA) for performing one or more aspects associated with user interaction and/or reporting. For example, RE 204 may be configured to utilize a UI (e.g., GUI 500) to display or provide log file data analysis, troubleshooting resolution recommendations, and/or a troubleshooting report. In this example, after a user selects an error or issue, RE 204 may display one or more resolution recommendations. In some embodiments, a resolution recommendation may include instructions for resolving an error or issue. In such embodiments, if instructions are scripted, RE 204 or another entity may allow a user to implement or execute the resolutions. In some embodiments, a resolution recommendation may include a guided walkthrough or advice for helping a user to implement the resolution.

In some embodiments, RE 204 may validate a resolution recommendation by performing a second test session and analyzing whether the same issue or error still occurred. For example, validation results from a related test session may indicate that a prior error or issue has been resolved or may indicate that the error or issue still exists or that a new error or issue is occurring.

In some embodiments, standards/technical specification data 206 may include error codes or information usable for indicating particular errors, issues, or failures (or types thereof), but may lack details regarding how or why the errors or failures occur and/or how to resolve them. For example, standards/technical specification data 206 may include information obtained, compiled, or derived from a standards body or technical specification data source, e.g., one or more 3GPP technical specification documents. In this example, standards/technical specification data 206 may include unique error codes or related identifiers obtained from the standards body or technical specification data source.

In some embodiments, technical support data 208 may include resolution information associated with various errors or issues and/or related data structures. For example, technical support data 208 may include information obtained, compiled, or derived from a technical support data source, e.g., a solutions database compiled by technical support technicians or users involved in software development or maintenance of a test platform or related test tool. In this example, technical support data 208 may be copied from an existing data store (e.g., an issue tracking system data store maintained by a test platform or tool manufacturer). Continuing with this example, technical support data 208 may include known issues and related root causes diagnosed and/or discerned by experts, programmers, or testers. In some embodiments, technical support data 208 may include recommendations or related data (e.g., written instructions, video instructions, and/or automated scripts) for fixing or resolving known errors or issues.

In some embodiments, integrated troubleshooting data 210 may include various troubleshooting data, e.g., associations between error codes (e.g., obtained from a standards body or technical specification data source) and resolution information (e.g., obtained from a technical support data source) and/or related data structures. For example, integrated troubleshooting data 210 may include root cause descriptions, resolution descriptions, and resolution information or recommendations. In some embodiments, resolution information may include instructions for adjusting one or more test settings or parameters associated with a test platform or related tool, adjusting settings or changing configurations of SUT 106, or running diagnostics on SUT 106 or a network node. In some embodiments, integrated troubleshooting data 210 may be generated using data obtained from standards/technical specification data 206 and technical support data 208.

In some embodiments, log file data 212 may include one or more data structures containing log files and/or related test session information. For example, log file data 212 may include a number of log files from test sessions performed by a related test platform or tester.

It will be appreciated that FIG. 2 is for illustrative purposes and that various depicted entities, their locations, and/or their functions described above in relation to FIG. 2 may be changed, altered, added, or removed. For example, in some embodiments, RE 204 and ATE 202 may be combined into a single module. It will also be appreciated that various entities in FIG. 2 may obtain or access any relevant data, including various types of data described above.

FIG. 3 is a diagram illustrating example resolution information 300. In some embodiments, resolution information 300 may be accessed and/or modified by data analyzer 103, ATE 202, RE 204, and/or other entities. Referring to FIG. 3, resolution information 300 is depicted using a table representing associations between error codes, error descriptions, resolution codes, probable solutions, resolution targets, and data sources. In some embodiments, resolution information 300 may be stored or maintained in one or more memories (e.g., data storage 104) in test environment 100. As depicted in FIG. 3, each row represents resolution information for a particular error code.

Error codes may represent suitable identifiers for different errors, failures, or types of errors or failures. For example, a standards body (E.G., 3GPP) may define different error codes for indicating different errors or issues. In another example, error codes may be generated by a test platform and may be proprietary or customized.

In some embodiments, an error code may be associated with one or more resolution codes. For example, as depicted in FIG. 3, the top three rows are associated with the same error code but each row includes a different resolution code representing a different potential resolution.

Error descriptions may represent text or other information for describing or defining an error. For example, error descriptions may be based on information provided by a standards body or a related technical specification. In another example, error descriptions may be provided or augmented by a technical support data source or related users (e.g., when troubleshooting or analyzing the error in a test scenario).

Resolution codes may represent suitable identifiers for different resolutions. For example, a resolution code may represent a unique resolution or recommendation. In this example, a resolution code may be associated with various types or forms of resolution, e.g., text, video, audio, executable scripts, etc.

Resolutions may represent text, video, audio, scripts, or other information usable for resolving or fixing an error or issue. For example, a resolution may include text or a video indicating that a user should check a particular test parameter at a radio frequency (RF) test tool, a user device, or another entity. In another example, a resolution may include a script (e.g., an executable program) for automatically changing parameters or otherwise resolving an error.

Resolution targets may represent a name or other information indicating where a resolution is to be performed. For example, a resolution target may be an RF test tool or platform, a device under test (DUT), or user equipment (UE). In some example, a resolution target may include multiple targets, e.g., when a resolution is for resolving complex errors or issues.

Data sources may represent identifiers or other information indicating where resolution information or related data (e.g., corresponding error data) is obtained or derived. For example, some resolution information may be derived by analyzing a 3GPP technical specification or by analyzing an issue tracking system data store.

It will be appreciated that resolution information 300 in FIG. 3 is for illustrative purposes and that different and/or additional information may also be stored or maintained. For example, each resolution recommendation may include a unique reference number for identification purposes. Further, it will be appreciated that resolution information 300 may be stored in various data structures, memories, media, data storages, and/or in one or more locations.

Figure 4:
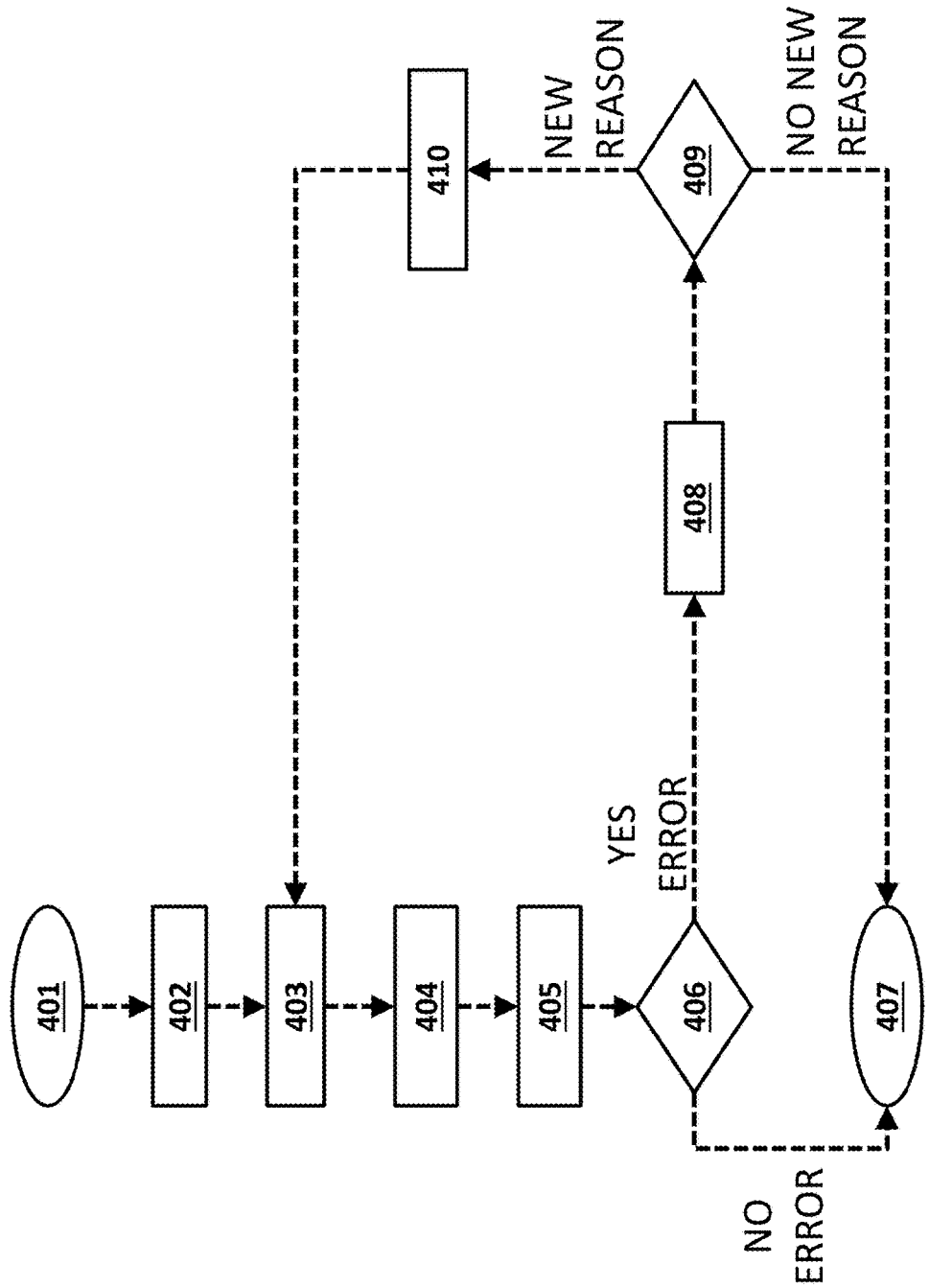
FIG. 4 is a flow chart illustrating an example process for generating an integrated troubleshooting data store.

FIG. 4 is a diagram illustrating an example process 400 for generating an integrated troubleshooting data store. In some embodiments, process 400, or portions thereof, may be performed by or at data analyzer 103, ATE 202, RE 204, and/or another node or module.

Referring to process 400, in step 401, process 400 may be started or initialized.

In step 402, data (e.g., standards/technical specification data 206) containing error codes (e.g., failure codes) may be obtained or derived from a standards body or technical specification data source, e.g., a 3GPP technical specification document or a set of 3GPP technical specification documents. For example, data analyzer 103 or another entity (e.g., ATE 202 or an analysis algorithm) may analyze a standards body or technical specification data source to obtain information about various errors or types of errors. In this example, data analyzer 103 may store a copy of the data sources or error information therein as standards/technical specification data 206 in one or more data stores.

In step 403, data (e.g., technical support data 208) containing root causes and/or possible solutions for various types of errors or failures may be obtained or derived from a technical support data source, e.g., an issue tracking system. For example, data analyzer 103 or another entity (e.g., ATE 202 or an analysis algorithm) may search a technical support data source for relevant resolution information (e.g., root causes and/or possible solutions) based on errors codes or related indicators obtained from a standards body or technical specification data source. In this example, data analyzer 103 may store a copy of the resolution information as technical support data 208 in one or more data stores.

In step 404, troubleshooting data (e.g., integrated troubleshooting data 210) may be generated and stored using error information and corresponding root causes and/or possible solutions obtained from multiple data sources.

In step 405, troubleshooting data and related troubleshooting functionality may be integrated with a log file viewer application.

In step 406, after opening a log file, it may be determined (e.g., by a log file viewer application or another entity) whether one or more errors are indicated in the log file.

In step 407, if no error is found, process 400 may end.

In step 408, if an error is found, corresponding resolution information (e.g., a root cause description and a resolution recommendation) may be determined, e.g., by searching the troubleshooting data using an error code or other identifier. For example, an analysis algorithm may use an error code from a log file to determine one or more possible resolution recommendations. In this example, each resolution recommendation may indicate a root cause for the related error along with a possible solution to resolve the error (e.g., instructions for correcting the error).

In some embodiments, an analysis algorithm may identify an error or failure issue and may analyze integrated troubleshooting data 210 to identify similar or corresponding reasons for the issue and/or resolution recommendations. For example, an analysis algorithm may analyze a log file for error information (e.g., an error code or indicator) and then may use the error information to search a data store (e.g., containing integrated troubleshooting data 210) for potentially relevant (e.g., similar) causes and/or solutions. In this example, the analysis algorithm may correlate a number of error codes with one or more corresponding resolution codes.

In some embodiments, an analysis algorithm may utilize any technique or algorithm that identifies an error code from log file data and uses the error code to identify possible solutions and/or causes. For example, an analysis algorithm may use heuristics to identify similar error codes to an error code found in a log file and then may search for known solutions related to the error code and any related error codes (e.g., by searching data 210 using a lookup key based on an error code, an error code portion, or another identifier). In some embodiments, identifying related error codes may occur when possible solutions and/or causes are not readily known for a particular error code in log file data. In other embodiments, identifying related error codes may be done regardless of whether a known solution exists for a particular error code. In these embodiments, possible solutions and/or causes associated with related error codes may be provided or presented as alternate possible solutions.

In some embodiments, an analysis algorithm may utilize a machine learning based linear regression algorithm. For example, data analyzer 103 or ATE 202 may utilize a trained linear regression algorithm for obtaining or identifying error codes from a standards body or technical specification data source. In this example, error codes may be input and a predicted value (e.g., a same code, an equivalent code, or a similar code) may be the output, where a best fit for this algorithm may result in the algorithm outputting the same code as the input for most (if not all) input. In some embodiments, a machine learning based linear regression algorithm may be used to translate error codes from one numbering system to another numbering system, e.g., 3GPP error codes to a proprietary error code numbering system; e.g., issue numbers assigned by an issue tracking system.

In some embodiments, an analysis algorithm may utilize a machine learning based classification algorithm. For example, data analyzer 103 or ATE 202 may utilize a trained Naive Bayes algorithm for obtaining or identifying one or more resolution recommendations (e.g., a set of potential error or issue reasons) using an error code or a related error code. In some embodiments, a trained Naive Bayes algorithm may use a posterior probability to predict the probability of different categories (e.g., resolutions or error reasons) based on various features (e.g., error code(s) or type of error(s)). For example, when testing a 5G mobile network, a secondary cell group (SCG) failure during a new radio (NR) cell addition can be caused by multiple reasons. In this example, these reasons may have one or more sub reasons and may also corresponding to one or more possible resolutions. Continuing with this example, a trained Naive Bayes algorithm can predict the most relevant causes for the SCG failure.

In some embodiments, a trained Naive Bayes algorithm, a trained linear regression algorithm, or another analysis algorithm may learn or determine error codes that are related to a source error code from log file data, e.g., by identifying similar error descriptions, by identifying similar error code numbering, or by analyzing patterns or connections in existing or predetermined (e.g., human-verified) error code associations). In such embodiments, the analysis algorithm may then correlate or associate the source error code with one or more resolutions (e.g., resolution codes) associated with the source error code and/or the learned related error codes using data derived or obtained from technical support data 208 or integrated troubleshooting data 210.

In step 409, it may be determined whether a current error or issue was caused by a new (or unknown) root cause or reason.

In step 407, if no new or previously unknown root cause or reason for the error is found, process 400 may end.

In step 410, if a new or previously unknown root cause or reason for the error is found, then resolution information may be added for subsequent usage. For example, after receiving possible resolution recommendations from data analyzer 103 or after data analyzer 103 fails to provide a resolution recommendation, a user may manually troubleshoot an error or issue to determine a root cause or reason for the error or issue. In this example, a related application may provide a UI or other mechanism for allowing the user to provide the root cause or reason to one or more data stores such that subsequent users can be benefit from the additional knowledge.

It will be appreciated that process 400 is for illustrative purposes and that different and/or additional actions may be used. It will also be appreciated that various actions described herein may occur in a different order or sequence.

Figure 5:
FIG. 5 is a diagram illustrating an example graphical user interface (GUI) for providing resolution recommendations.

FIG. 5 is a diagram illustrating an example GUI 500 for providing resolution recommendations. In some embodiments, GUI 500 may represent a page or view provided by a log file viewer application or a test platform or tool usable for display log file data and providing resolution information for identified errors or issues. For example, GUI 500 may provide a GUI element (e.g., a container or panel) that represents relevant troubleshooting information for one or more errors or issues associated with an opened or displayed log file.

In some embodiments, GUI 500 may provide resolution recommendations and related information for a given error code or failure identified by automated analysis of log file data. In such embodiments, GUI 500 may provide UI elements for allowing a user to review details about the recommendations and/or to select one or more recommendations for implementation, e.g., automatically or via a guided walkthrough or setup.

Referring to FIG. 5, GUI 500 may include GUI elements 502-508 for various aspects associated with reviewing, parsing, and understanding a log file data. GUI 500 may provide a GUI element 502 for providing log records. For example, GUI element 502 may include a summary of messages and/or events associated with one or test sessions in a list format or a tabular format. In this example, GUI element 502 may allow a user to select one or more items in the list for additional details or information and, after selection, other UI elements may be updated accordingly.

GUI 500 may provide a GUI element 504 for message or event details. For example, GUI element 504 may include a list of parameter values and/or attributes associated with a message or event of a log record. In this example, GUI element 504 may allow a user to select one or more items in the list for additional details or information.

GUI 500 may provide a GUI element 506 for showing troubleshooting data. For example, GUI element 506 may include information related a particular error or failure, including, for example, an associated log file line, an error code, an error written description, one or more resolution codes, and one or more solutions or resolution recommendations. In this example, GUI element 506 may allow a user to select one or more displayed items for additional details or information.

GUI 500 may provide a GUI element 508 for filtering log file data. For example, GUI element 508 may include a list of filtering criteria. In this example, GUI element 508 may allow a user to select one or more items in the list for filtering log file data using the selected criteria.

It will be appreciated that FIG. 5 and its related description are for illustrative purposes and that additional and/or different UI elements may be usable for displaying, inputting, or interacting with troubleshooting information.

Figure 6:
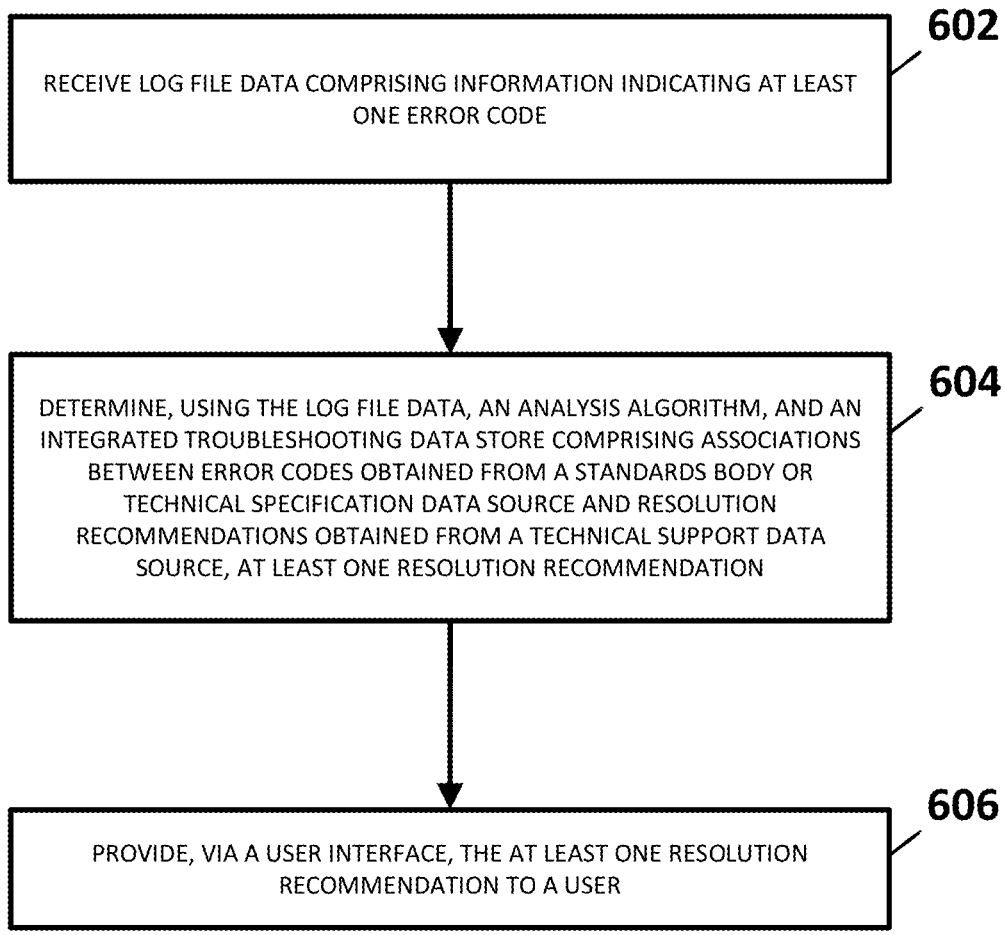
FIG. 6 is a flow chart illustrating an example process for troubleshooting test environments using automated analysis of log file data.

FIG. 6 is a diagram illustrating an example process 600 for troubleshooting test environments using automated analysis of log file data. In some embodiments, process 600, or portions thereof, may be performed by or at data analyzer 103, ATE 202, RE 204, and/or another node or module. In some embodiments, process 600 may include steps 602, 604, and/or 606.

Referring to process 600, in step 602, log file data comprising information indicating at least one error code may be received. In some embodiments, log file data may include information from an alf type log file, a pcap type log file, an iq type log file, a real time trace file, or an extensible markup language file.

In step 604, it may be determined, using the log file data, an analysis algorithm, and an integrated troubleshooting data store (e.g., integrated troubleshooting data 210) comprising associations between error codes obtained from a standards body or technical specification data source (e.g., standards/technical specification data 206) and resolution recommendations obtained from a technical support data source (e.g., technical support data 208), at least one resolution recommendation.

In some embodiments, an analysis algorithm may include an heuristics based algorithm, an artificial intelligence algorithm, a trained machine learning algorithm, a linear regression algorithm, or a naive Bayes algorithm.

In some embodiments, an analysis algorithm may determine a failure issue based on at least one error code and may determine, using a integrated troubleshooting data store, at least one resolution recommendation based on the failure issue.

In some embodiments, determining at least one resolution recommendation comprises: determining that an integrated troubleshooting data store lacks the at least one resolution recommendation; accessing, using at least one error code or a related identifier, a technical support data source or another data source to determine the at least one resolution recommendation; and storing, in the integrated troubleshooting data store, an association between the at least one resolution recommendation and the at least one error code and/or the failure issue.

In step 606, the at least one resolution recommendation may be provided, via a user interface, to a user.

In some embodiments, a resolution recommendation may include a resolution description, a resolution target device, or one or more additional resolution recommendations.

In some embodiments, a data analyzer (e.g., data analyzer 103) for performing process 600 or portions thereof may include a network test system, a network protocol tool, a protocol carrier acceptance tool, a protocol conformance tool, a radio frequency (RF) conformance test tool, a test platform, a test tool, or a log file data viewer.

In some embodiments, at least one resolution recommendation may be stored in a data structure accessible via an API or a UI (e.g., GUI 500). For example, integrated troubleshooting data 210 in data storage 104 may be accessible using a representational state transfer (REST) API or a web-based UI.

It will be appreciated that process 600 is for illustrative purposes and that different and/or additional actions may be used. It will also be appreciated that various actions described herein may occur in a different order or sequence.

It should be noted that data analyzer 103, ATE 202, RE 204, and/or functionality described herein may constitute a special purpose computing device. Further, data analyzer 103, ATE 202, RE 204, and/or functionality described herein can improve the technological field of network testing, including, e.g., troubleshooting testing issues and/or providing issue resolution recommendations. For example, data analyzer 103 may receive one or more log files associated with testing SUT 106 and may use one or more analysis algorithms (e.g., linear searching, key (e.g., error code) lookup, AI algorithms, and/or machine learning algorithms) to analysis log file data, determine a failure reason (e.g., an error code or other information), and/or determine, using the failure reason, at least one resolution recommendation from integrated troubleshooting data 210, e.g., correlated data obtained from multiple data sources, where the data includes failure reasons and corresponding resolution recommendations.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for troubleshooting test environments using automated analysis of log file data, the method comprising:
   at a data analyzer:
   receiving log file data comprising information indicating at least one error code;
   determining, using the log file data, an analysis algorithm, and an integrated troubleshooting data store comprising associations between error codes obtained from a standards body or technical specification data source and resolution recommendations obtained from a technical support data source, at least one resolution recommendation, wherein determining the at least one resolution recommendation includes using a linear regression algorithm to translate an error code from one numbering system to another numbering system; and
   providing, via a user interface, the at least one resolution recommendation to a user.

2. The method of claim 1 wherein the analysis algorithm includes an heuristics based algorithm, an artificial intelligence algorithm, a trained machine learning algorithm, or a naive Bayes algorithm.

3. The method of claim 1 wherein the analysis algorithm determines a failure issue based on the at least one error code and determines, using the integrated troubleshooting data store, the at least one resolution recommendation based on the failure issue.

4. The method of claim 3 wherein determining the at least one resolution recommendation comprising:
   determining that the integrated troubleshooting data store lacks the at least one resolution recommendation;
   accessing, using the at least one error code or a related identifier, the technical support data source or another data source to determine the at least one resolution recommendation; and
   storing, in the integrated troubleshooting data store, an association between the at least one resolution recommendation and the at least one error code and/or the failure issue.

5. The method of claim 1 wherein the at least one resolution recommendation includes a resolution description, a resolution target device, or one or more additional resolution recommendations.

6. The method of claim 1 wherein the standards body or technical specification data source includes information from a 3rd Generation Partnership Project (3GPP) data store, a fifth generation (5G) data store, a fourth generation (4G) data store, or a 3GPP technical specification document.

7. The method of claim 1 wherein a technical support data source includes information from a software development support system data store, a ticketing system data store, or an issue tracking system data store.

8. The method of claim 1 wherein the log file data includes information from an alf type log file, a pcap type log file, an iq type log file, a real time trace file, or an extensible markup language file.

9. The method of claim 1 wherein the data analyzer includes a network test system, a network protocol tool, a protocol carrier acceptance tool, a protocol conformance tool, a radio frequency (RF) conformance test tool, a test platform, a test tool, or a log file data viewer.

10. A system for troubleshooting test environments using automated analysis of log file data, the system comprising:
    at least one processor;
    a memory; and
    a data analyzer implemented using the at least one processor and the memory, wherein the data analyzer is configured for:
    receiving a log file data comprising information indicating at least one error code;
    determining, using the log file data, an analysis algorithm, and an integrated troubleshooting data store comprising associations between error codes obtained from a standards body or technical specification data source and resolution recommendations obtained from a technical support data source, at least one resolution recommendation, wherein determining the at least one resolution recommendation includes using a linear regression algorithm to translate an error code from one numbering system to another numbering system; and
    providing, via a user interface, the at least one resolution recommendation to a user.

11. The system of claim 10 wherein the analysis algorithm includes an heuristics based algorithm, an artificial intelligence algorithm, a trained machine learning algorithm, or a naive Bayes algorithm.

12. The system of claim 10 wherein the analysis algorithm determines a failure issue based on the at least one error code and determines, using the integrated troubleshooting data store, the at least one resolution recommendation based on the failure issue.

13. The system of claim 10 wherein determining the at least one resolution recommendation comprising:
    determining that the integrated troubleshooting data store lacks the at least one resolution recommendation;
    accessing, using the at least one error code or a related identifier, the technical support data source or another data source to determine the at least one resolution recommendation; and
    storing, in the integrated troubleshooting data store, an association between the at least one resolution recommendation and the at least one error code and/or the failure issue.

14. The system of claim 10 wherein the at least one resolution recommendation includes a resolution description, a resolution target device, or one or more additional resolution recommendations.

15. The system of claim 10 wherein the standards body or technical specification data source includes information from a 3rd Generation Partnership Project (3GPP) data store, a fifth generation (5G) data store, a fourth generation (4G) data store, or a 3GPP technical specification document.

16. The system of claim 10 wherein the technical support data source includes information from a software development support system data store, a ticketing system data store, or an issue tracking system data store.

17. The system of claim 10 wherein the log file data includes information from an alf type log file, a pcap type log file, an iq type log file, a real time trace file, or an extensible markup language file.

18. The system of claim 10 wherein the data analyzer includes a network test system, a network protocol tool, a protocol carrier acceptance tool, a protocol conformance tool, a radio frequency (RF) conformance test tool, a test platform, a test tool, or a log file data viewer.

19. A non-transitory computer readable medium having stored thereon executable instructions that when executed by at least one processor of at least one computer cause the at least one computer to perform steps comprising:
    receiving a log file data comprising information indicating at least one error code;
    determining, using the log file data, an analysis algorithm, and an integrated troubleshooting data store comprising associations between error codes obtained from a standards body or technical specification data source and resolution recommendations obtained from a technical support data source, at least one resolution recommendation, wherein determining the at least one resolution recommendation includes using a linear regression algorithm to translate an error code from one numbering system to another numbering system; and
    providing, via a user interface, the at least one resolution recommendation to a user.

20. The non-transitory computer readable medium of claim 19 wherein the analysis algorithm includes an artificial intelligence algorithm, a trained machine learning algorithm or a naive Bayes algorithm.

* * * * *